United States Patent Office 2,892,356
Patented June 30, 1959

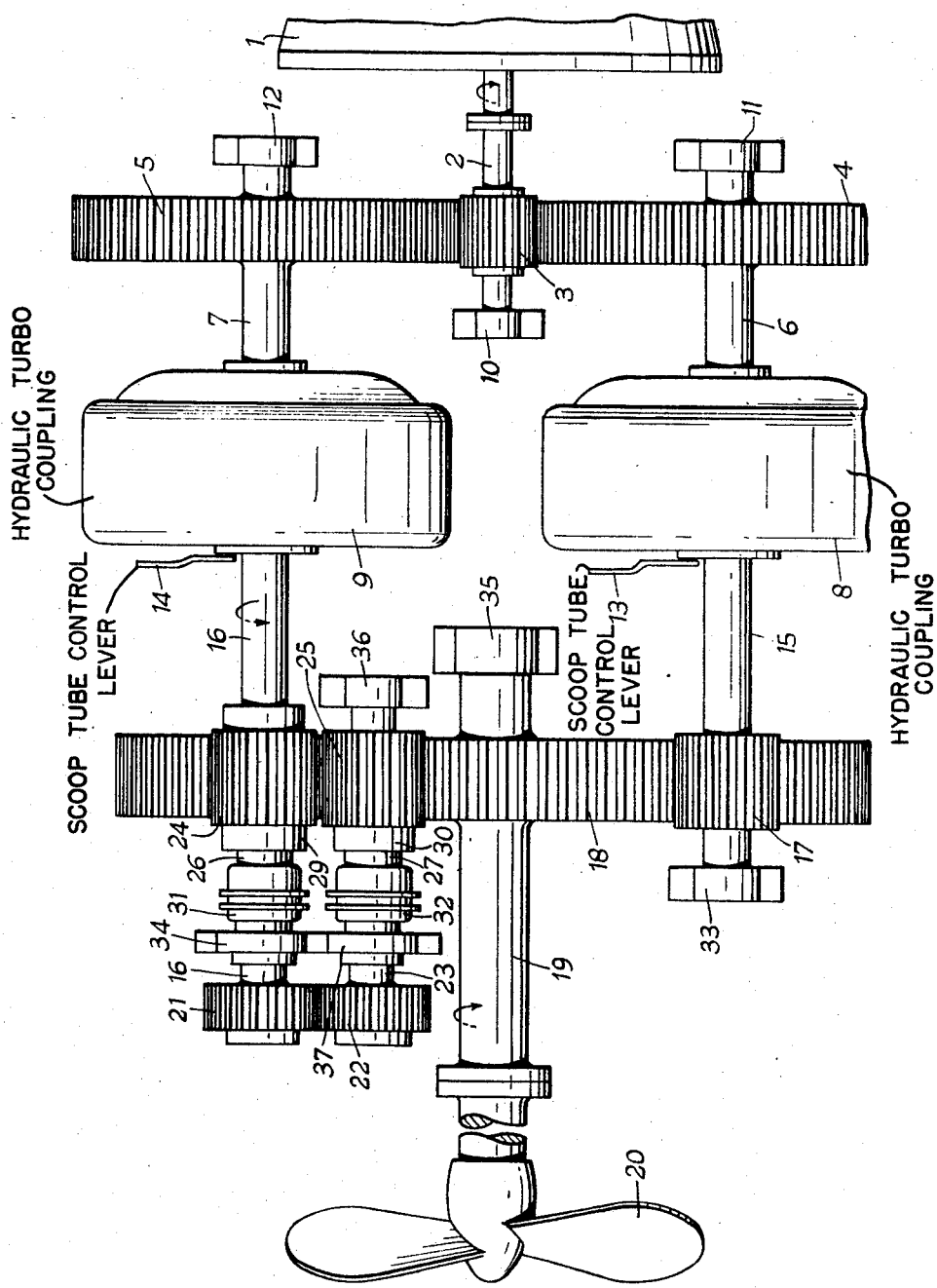

2,892,356

POWER TRANSMISSION MECHANISMS

Harold Sinclair, Windsor, England

Application March 12, 1953, Serial No. 341,886

Claims priority, application Great Britain March 13, 1952

4 Claims. (Cl. 74—361)

This invention relates to power transmission mechanisms, capable of providing forward and reverse drive, for use with a driving member, for example a high pressure and/or high temperature steam or gas turbine which, due to the tendency of the driving member to speed up when freed from the load, cannot conveniently be employed in conjunction with reverse gearing which has a neutral condition in which no load is imposed on the driving member. This tendency is undesirable because over-speeding is likely to damage the turbine, and the object of the invention is to provide a mechanism such that during the change-over from forward to reverse drive and vice-versa the driving member remains under load.

According to the invention there is provided power-transmission mechanism comprising gearing providing between a driving member and a driven member two parallel power paths one of which provides forward drive and the other of which is capable of selectively providing forward and reverse drive, and each of the said power paths including a controllable hydraulic or magnetic slip coupling.

In order that the said other power path may be capable of yielding forward and reverse drive it may include any suitable form of reverse gearing, for example reverse gearing suitable for prime movers of high power as described in patent specification No. 2,559,740 in the embodiment wherein a slip coupling is used and the said slip coupling is the hydraulic or magnetic coupling associated with the said other power path.

In order that the invention may be clearly understood and readily carried into effect, it will now be described in more detail with reference to the accompanying drawing, the single figure of which is a plan view of a marine propulsion system incorporating the invention.

Referring to the drawing, the driving member of the system is a gas turbine or steam turbine 1, on the output shaft 2 of which is mounted a first pinion 3 the teeth of which engage with the teeth of a first gear wheel 4 and a second gear wheel 5, the gear wheels 4 and 5 being mounted respectively on the input shafts 6 and 7 of first and second hydraulic turbo couplings 8 and 9. Bearings for the shafts 2, 6 and 7 are shown at 10, 11 and 12 respectively.

Each of the hydraulic turbo couplings is of the type disclosed, for example, in U. S. Patents 2,264,340 and 2,264,341 which is capable of rapid filling and emptying of the working circuit and wherein the degree of filling of the working circuit is determined by the setting of an adjustable scoop tube, the scoop tube of coupling 8 being manually controlled by means of a scoop tube lever 13, and the scoop tube of coupling 9 being manually controlled by means of a scoop tube lever 14. It will be understood that the vaned impellers of the turbo couplings are mounted on the respective input shafts 6 and 7. The vaned runners of the turbo couplings are mounted on the respective output shafts 15 and 16 of the couplings 8 and 9. These shafts are provided with bearings 33 and 34 respectively.

The output shaft 15 of the turbo coupling 8 has mounted thereon a second pinion 17 the teeth of which engage with the teeth of a third gear wheel 18 mounted on the shaft 19 of the propeller 20. One bearing of this shaft is shown at 35. The output shaft 16 of the turbo coupling 9 has mounted thereon a fourth gear wheel 21 the teeth of which engage with the teeth of a similar fifth gear wheel 22 mounted on a lay shaft 23 provided with bearings 36 and 37. The output shaft 16 of the turbo coupling carries a third pinion 24 the teeth of which engage with the teeth of the gear wheel 18, and the lay shaft 23 carries a fourth pinion 25 the teeth of which also engage with the teeth of the gear wheel 18. First and second clutches are provided for selectively clutching the pinions 24 and 25 to their respective shafts 16 and 23. The clutches which are of the synchro-self-shifting type, are shown diagrammatically as comprising nuts 26 and 27 movable helically on the shafts 16 and 23 respectively so as to engage jaw clutch teeth on the nuts with internal jaw clutch teeth on rings 29 and 30 which are fast with the pinions 24 and 25 respectively. The first clutch, comprising nut 26, is provided with an axially movable locking sleeve 31 which enables the clutch to be locked in the engaged position or unlocked so as to be capable of disengaging when the ring 29 tends to overrun the shaft 16, and the second clutch, comprising nut 27, is provided with a similar control sleeve 32. The helical paths which the nuts 26 and 27 can follow on their respective shafts 16 and 23 are of opposite hand.

The gear wheels 21 and 22, the pinions 24 and 25, and the above-mentioned first and second clutches together provide a reversible gearing, similar to that described in patent specification No. 2,559,740, by means of which drive can be transmitted from the output shaft 16 of the turbo coupling 9 selectively in forward or reverse sense to the gear wheel 18 on the propeller shaft 19.

When the lever 13 is in a position in which the working circuit of turbo coupling 8 is filled, a first power path is established from the turbine output shaft 2 to the propeller shaft 19, via pinion 3, gear wheel 4, pinion 17 and gear wheel 18, to tend to drive the propeller 20 in forward sense. When the lever 14 is in a position in which the working circuit of turbo coupling 9 is filled, a second power path is established from the turbine shaft 2 to the propeller shaft 19, via pinion 2, gear wheel 5, the above-mentioned reversible gearing and gear wheel 18, to tend to drive the propeller 20 in forward or reverse sense according to the setting of the reversible gearing. For forward drive via the second power path, pinion 24 is coupled to the shaft 16 and pinion 25 is uncoupled from the shaft 23. For reverse drive via the second power path pinion 24 is uncoupled from shaft 16 and pinion 25 is coupled to shaft 23.

In the operation of the mechanism described, for normal ahead running the scoop tubes of the two hydraulic couplings 8 and 9 are adjusted to maintain the working circuits of both couplings filled, the pinion 24 is clutched to the output shaft 16 of the turbo coupling 9 by the first clutch, and the second clutch is inoperative so that pinion 25 is not clutched to the lay shaft 23 and rotates idly in the opposite sense thereto. Under these conditions forward driving torque is transmitted from the turbine 1 to the propeller shaft 19 via both power paths, each of the hydraulic couplings 8 and 9 transmitting half of the full driving torque of the turbine. Each of the power paths comprises a double reduction gearing, and the impellers and runners of the couplings 8 and 9 rotate at angular speeds which are between the speed of the output shaft 2 of the turbine 1 and the speed of the propeller shaft 19, and which may readily be arranged, by suitable choice of the pinion and gear wheel sizes, to be sufficiently high to enable high powers to be transmitted by turbo couplings of conventional design and materials but not so high as to require special materials and to involve internal windage loss and heating problems when the working circuit of one or other coupling is empty and, as in cases to be described, the impeller and runner of the "empty" coupling are rotated in opposite senses by the turbine and propeller shafts respectively.

When it is desired to change over from normal ahead running with both couplings 8 and 9 filled, to astern running as in manoeuvring, the working circuit of the turbo coupling 9 is emptied and the turbine power is reduced or cut off. The reversible gearing is then set for reverse drive by disengaging the first clutch so as to disengage the pinion 24 from shaft 16, and then engaging the second clutch so as to couple the pinion 25 to the lay shaft 23. The working circuit of the coupling 9 is then filled again, the mechanism then being in a neutral condition in which the two power paths are operative to apply torque to the propeller shaft 19 in opposite senses, so that if the turbine power is not completely cut off the two filled and more or less stalled couplings impose on the turbine 1 a load which prevents it from over-speeding as might occur if no load were on it in the neutral condition of the mechanism. In order to go astern, the working circuit of coupling 8 is then emptied, and the power output of the turbine is increased if necessary whereupon power is transmitted by the turbo coupling 9 to the propeller shaft 19 in "astern" sense due to the reversible gearing having been set in reverse condition.

If now it is desired to stop the propeller 20 and go ahead temporarily, as in manoeuvring, the working circuit of coupling 8 is filled and then the working circuit of the coupling 9 is emptied. These operations may be effected simultaneously, passing through a condition in which both working circuits are at least partially filled, and for this purpose the scoop tube levers 13 and 14 may be interconnected mechanically. A neutral condition is passed through in which the propeller shaft 19 is subjected to approximately equal torque in opposite senses and thus experiences no effective driving torque, whereas in the said neutral condition load is nevertheless imposed on the turbine 1 due to both of the turbo couplings having their working circuits sufficiently or completely filled in the neutral condition.

When it is again desired to go astern the working circuit of the turbo coupling 9 is filled or kept full and that of the coupling 8 is emptied, load being maintained on the turbine 1 although the transmission passes through a neutral condition.

If both couplings 8 and 9 were simultaneously "empty" no load would be imposed on the turbine 1 and especially in the case of a gas turbine it might overspeed. It is therefore essential that in change-over from ahead to astern running and vice-versa the "empty" coupling should be at least partly filled before the other coupling is emptied.

It will be seen from the above description that during ahead and astern manoeuvring change-over is effected easily by filling the appropriate coupling and emptying the other coupling.

When it is desired to return to normal ahead running after manoeuvring ahead, the reversible gearing is set for forward drive by appropriate operation of the first and second clutches, the working circuit of coupling 9 is filled and the turbine power is increased, whereupon the vessel is propelled ahead under power transmitted by both couplings.

It will be observed that whereas the power transmission mechanism incorporates two controllable slip couplings 8 and 9 for selectively providing ahead or astern drive, as has previously been proposed, it is a feature of the invention that the two slip couplings are normally operated in parallel during ahead running and each is transmitting half the load, hence their slip will be about half the slip which would occur if a single coupling of the same size were used to transmit the full power. Conversely, somewhat smaller couplings can be used to operate at full power with the same percentage slip as would be acceptable for a single coupling: such smaller couplings would have ample power capacity for individual operation when manoeuvring.

A further desirable feature of the invention is that since during normal ahead running both slip couplings 8 and 9 are in operation there is an avoidance of the internal windage and heating losses that are unavoidably present in a slip coupling that is used exclusively for the astern power path and is disengaged to run idly during most of its life during normal ahead running as has previously been proposed.

I claim:

1. Power-transmission mechanism comprising a driving member, a driven member, at least one power path capable of driving said driven member in only one direction for a given driving direction of said driving member, and at least one other power path which includes controllable means whereby said other power path can be selectively arranged for driving said driven member in said one direction in conjunction with said first-mentioned power path or in the opposite direction, for the said given driving direction of said driving member, each of said power paths including a hydraulic turbo coupling of the type provided with means operable to vary the degree of filling of the working circuit while the coupling is in operation.

2. Power-transmission mechanism comprising a driving member, a driven member, at least one power path capable of driving said driven member in only one direction for a given driving direction of said driving member, and at least one other power path which includes controllable means whereby said other path can be selectively arranged for driving said driven member in said one direction in conjunction with said first-mentioned path or in the opposite direction, each of said power paths including a slip coupling of the type provided with means operable to vary the slip in said coupling while it is in operation.

3. Power-transmission mechanism comprising a driving member, a driven member, at least one power path which for a given driving direction of said driving member drives said driven member in the forward direction, at least one other path which includes reversing gearing whereby for the said driving direction of said driving member said other path can be selectively arraged for driving said driven member in the forward direction in conjunction with said first-mentioned power path, or in the reverse direction, each of said power paths including a slip coupling of the type provided with means operable to vary the slip in the coupling while it is in operation.

4. Power transmission mechanism comprising a driving member, a driven member, at least one power path capable of driving said driven member in only one direction for a given driving direction of said driving member, and at least one other power path between said driving and driven members, said other power path including reversing gearing whereby said other power path can be selectively arranged for driving said driven member in said one direction in conjunction with said first power path, or in the reverse direction, each of said power paths including a hydraulic turbo coupling of the type provided with means operable to vary the degree of filling of the working circuit while the coupling is in operation.

(References on following page)

References Cited in the file of this patent

UNITED STATES PATENTS

| | | |
|---|---|---|
| 1,248,735 | Sitney | Dec. 4, 1917 |
| 2,535,904 | Davis | Dec. 26, 1950 |
| 2,536,897 | Wood | Jan. 2, 1951 |
| 2,559,740 | Sinclair | July 10, 1951 |
| 2,568,275 | Dahlstrand | Sept. 18, 1951 |

FOREIGN PATENTS

| | | |
|---|---|---|
| 131,650 | Austria | Feb. 10, 1933 |